Patented Apr. 28, 1931

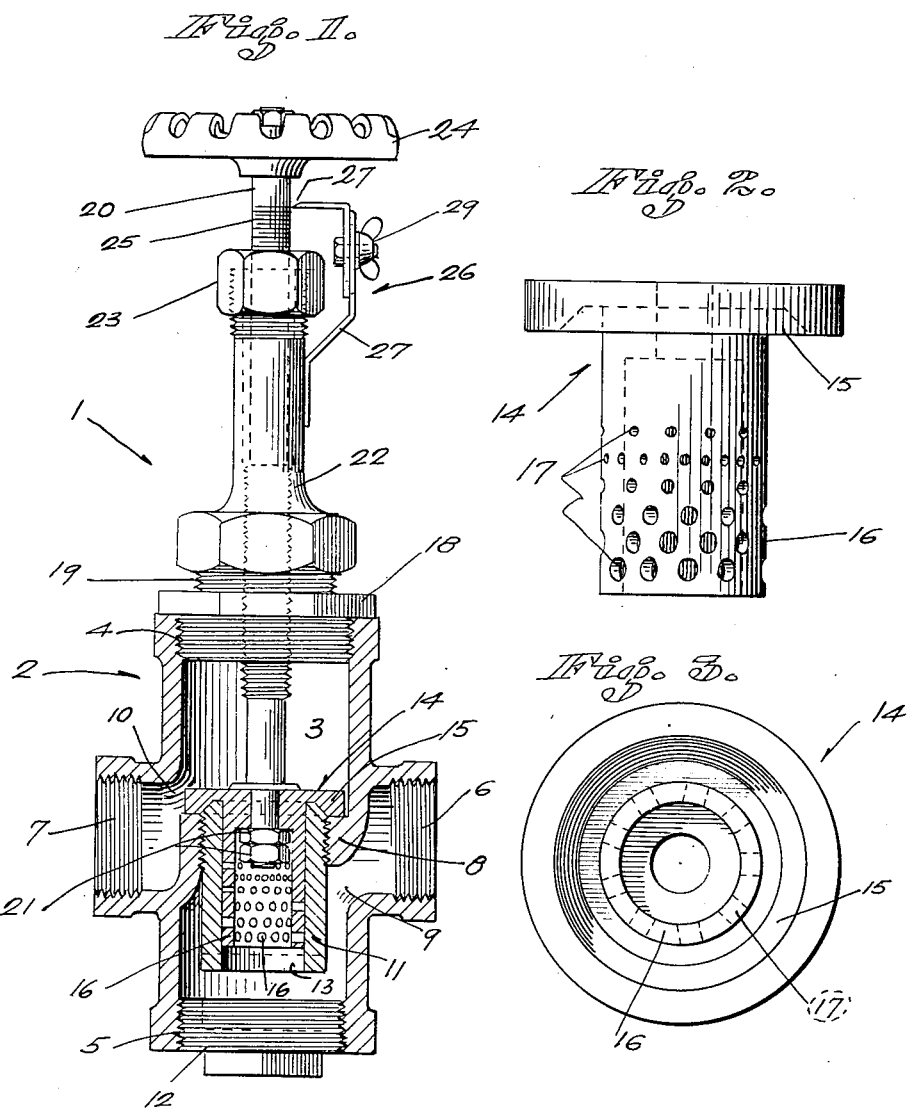

1,802,897

UNITED STATES PATENT OFFICE

JESSE N. HOLDEN AND ORVIN N. NICHOLS, OF OLEUM, CALIFORNIA

THROTTLE VALVE

Application filed September 27, 1926. Serial No. 138,054.

Our invention relates to throttle valves for controlling the flow of fluids, which may be either liquids or gases, such as steam or air.

The primary object of the invention is to construct a throttle valve so that the valve-closure member therein must be moved a comparatively great distance from its seat before fluid can flow through the valve. By this arrangement the seat-engaging portion of the closure member is protected from the injurious action of such foreign substances as may be carried with the fluid through the valve, or from the violent contact of the fluid itself with the seat-engaging portion of the closure member, which contact, if the seat-engaging portion is in proximity to the valve seat when the fluid flows through the valve, will invariably result in a rapid deterioration of the closure member and consequently in a short time cause the valve to leak and thus make it useless.

Another object of the invention is to construct a valve so that the opening of the valve-closure member is proportionate to the flow of fluid through the valve. This is called "straight line opening".

A further object is to provide means for indicating the amount of valve opening.

Still further objects and advantages will appear from the following detailed description, illustrated in the accompanying drawings, in which:

Figure 1 is a side elevation of the throttle valve of our invention, the valve casing and the valve-seat and valve-closure members being shown in midsection;

Figure 2 is an enlarged side elevation of the valve-closure member; and

Figure 3 is a bottom plan thereof.

The throttle valve of our invention is indicated in the drawings by the numeral 1. This valve comprises a casing 2, provided with a cylindrical chamber 3, which is threaded at its ends 4 and 5, and with an inlet 6 and an outlet 7, both communicating with the chamber and being suitably threaded for pipe line connection. Within the chamber 3 the casing 2 has formed integral therewith a wall 8, which extends so that the inlet communicates with the chamber on one side of the wall through a passage 9, and the outlet communicates with the chamber on the other side of the wall through a passage 10. The wall 6 is bored and threaded concentrically with the chamber 3 and a cylindrical valve-seat member 11 is adapted to be inserted into the chamber 3 through the end 5 and to be screwed into place in the wall 8, whereafter the end 5 is sealed with a screw plug 12.

Throughout the length of the valve-seat member 11 is a bore 13, which is concentric with the chamber 3, and a valve-closure member 14 provided with a portion 15 adapted to engage the seat of the valve-seat member 11, is also provided with a tubular portion 16, which is concentric with the seat-engaging portion and slidably fits in the bore 13. In the tubular portion and at a distance from the seat-engaging portion is a series of annular rows of apertures 17, which are so arranged that the apertures in the row nearest to the seat-engaging portion are of the smallest diameter, and the apertures in the other rows are progressively increased in diameter from the row of the smallest apertures. In the end 4 is screwed a flanged nipple 18, which has a threaded outward extension 19 and is tapped and threaded in concentric relation to the chamber 3 so as to receive therein the threaded portion of a valve stem 20, which is reduced at its inner end and extends therewith centrally through the seat-engaging portion and into the tubular portion of the valve-closure member, and is provided with lock nuts 21 thereon for rotatably securing the valve stem to the valve-closure member.

A principal gland 22, which has its end externally threaded, is screwed upon the extension 19, and an auxiliary gland 23 is screwed upon the threaded end of the gland 22, suitable packings, of course, being used in conjunction with the glands for preventing escape of fluid around the valve stem from the chamber 3. For turning the valve stem a hand wheel 24 is supplied.

The valve stem is also provided with indicating marks 25, and an indicator 26, adapted to register with the indicating marks, is suitably secured to the throttle valve, the indicator in this instance being shown as secured to the gland 22. Preferably, the indicator is made adjustable and comprises a pointer 27 adapted to slide upon a supporting portion 28 and secured thereto by locking means 29.

The throttle valve 1 constructed as described in the foregoing is particularly advantageous for controlling the flow of steam or other gases under high pressure. It should in this connection be noted that, in order to increase the efficiency and the lasting quality of the valve, the first row of aperture 17 is at a considerable distance from the seat-engaging portion 15 of the valve-closure member 14, so that, before the fluid can pass from the inlet to the outlet, the valve stem must be turned until that row is in registration with the top of the valve seat in the valve-seat member 11. The seat-engaging portion is then so far away from the valve seat that it can not be materially affected by the rush of the fluid, and, furthermore, the tendency of the fluid is first to rush sidewise from the apertures in the tubular portion toward the outlet, so that the seat-engaging portion of the valve-closure member is only indirectly in the path of the flow and therefore the wear and tear on the seat-engaging portion is considerably lessened.

It should be observed that by the progressive increase of the diameters of the apertures, when the valve is used for controlling the flow of steam, the steam is superheated on account of the lower pressure differential set up on the outlet side of the tubular portion of the valve-closure member.

Since both the plug 12 and the flanged nipple 18 are easily removable, even without disconnecting the valve from the pipe lines, an easy access is had at all times both to the valve-closure member and the valve-seat member, and repairs of the valve are therefore easily effected.

We claim as our invention:

1. A valve comprising a body having an inlet and an outlet, a bridge disposed between the inlet and the outlet, said body having an opening in the bottom thereof large enough for permitting a valve seat to be passed therethrough, a valve seat and guide threaded into the bridge, a closure for the opening in the bottom, said closure being spaced away from the bottom of the valve seat, and a valve slidable in the guide and being movable toward and away from said seat.

2. A valve comprising a body having an inlet and an outlet, a bridge extending between said inlet and said outlet, a valve seat and guide carried by said bridge, said body having an opening in its top large enough to receive a valve member, a valve member slidable in the guide, means for moving said valve member toward and away from said seat, and a closure for the opening in the top, said closure being spaced away from the valve member, said valve shielding the closure from the matter passing through the valve.

3. A valve comprising a body having an inlet and an outlet, a bridge dividing the inlet from the outlet, said valve having an opening in the bottom thereof large enough to receive a valve seat and an opening in the top thereof large enough to receive a valve member, a valve seat and guide passed through said bottom opening and being secured to the bridge, and a valve member passed through the top opening and being slidable in the valve guide and movable toward and away from said seat, and closures for the top and bottom openings, said closures being spaced away from said valve member and said valve seat respectively.

4. A straight line opening valve comprising a casing having an inlet and an outlet, a valve body guide disposed between the inlet and an outlet and having an open end always in communication with the inlet, a valve body slidable in said guide, the top of said guide being fashioned into a valve seat, said valve body having a projection designed to seat on said valve seat, said valve body having openings graduated in size from small to large ones and spaced so as to provide a straight line opening, the top row of openings being disposed on the valve body so that its projecting portion will clear the valve seat before the row is uncovered, and means for moving the valve body for uncovering the openings in sequence.

JESSE N. HOLDEN.
ORVIN N. NICHOLS.